United States Patent
Hobelsberger et al.

(10) Patent No.: US 7,117,744 B2
(45) Date of Patent: Oct. 10, 2006

(54) APPARATUS AND METHOD FOR DETECTING VIBRATIONS OF THE SHAFT ASSEMBLY IN AN ELECTRICAL MACHINE

(75) Inventors: Max Hobelsberger, Wuerenlingen (CH); Ingo Kirchhoff, Bellikon (CH); Zlatimir Posedel, Neuenhof (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 11/075,521

(22) Filed: Mar. 9, 2005

(65) Prior Publication Data

US 2005/0183504 A1  Aug. 25, 2005

Related U.S. Application Data

(63) Continuation of application No. PCT/EP03/50610, filed on Sep. 5, 2003.

(30) Foreign Application Priority Data

Sep. 10, 2002  (CH) ................... 1529/02

(51) Int. Cl.
*G01H 11/06* (2006.01)
(52) U.S. Cl. ..................... 73/660
(58) Field of Classification Search ............ 73/660, 73/650; 324/772
See application file for complete search history.

(56) References Cited

U.S. PATENT DOCUMENTS

| | | |
|---|---|---|
| 3,885,420 A | 5/1975 | Wolfinger .............. 73/70.1 |
| 3,934,459 A | 1/1976 | Wolfinger et al. ........ 73/70.1 |
| 4,137,780 A | 2/1979 | Wolfinger ............... 73/650 |
| 4,148,222 A | 4/1979 | Wolfinger ............... 73/650 |
| 4,317,371 A | 3/1982 | Wolfinger ............... 73/650 |
| 4,444,064 A | 4/1984 | Wolfinger ............ 73/862.34 |
| 4,793,186 A * | 12/1988 | Hurley .................. 73/650 |
| 4,814,699 A | 3/1989 | Koziel et al. ......... 324/158 MG |
| 4,831,295 A | 5/1989 | Posedel ................ 310/72 |
| 5,006,769 A | 4/1991 | Posedel ............... 318/434 |
| 5,543,698 A * | 8/1996 | Tao et al. .............. 73/462 |
| 6,460,013 B1 | 10/2002 | Nippes ................. 702/183 |
| 6,714,020 B1 * | 3/2004 | Hobelsberger et al. ..... 324/525 |

FOREIGN PATENT DOCUMENTS

| | | |
|---|---|---|
| DE | 197 42 622 | 4/1999 |
| EP | 0 271 678 | 6/1988 |
| EP | 0 391 181 | 10/1990 |
| WO | WO 00/69062 | 11/2000 |

OTHER PUBLICATIONS

M. R. Bai et al.: Development of an on-line diagnosis system for rotor vibration via model-based intelligent inference, Journal of the Acoustical Society of America, American Institute of Physics, New York, vol. 107, No. 1, Jan. 2000, pp. 315-323.

* cited by examiner

*Primary Examiner*—John E. Chapman
(74) *Attorney, Agent, or Firm*—Darby & Darby

(57) ABSTRACT

A method for detecting vibrations of a shaft of an electrical machine includes measuring at least one of a shaft voltage and a shaft current and analyzing the measured at least one of the shaft voltage and the shaft current so as to determine the vibrations. In addition, an apparatus for detecting vibrations of a shaft of an electrical machine includes a first grounding device disposed at a first point on the shaft on a first side of the electrical machine and a second grounding device disposed at a second point of the shaft on a second side of the electrical machine. The second grounding device is configured to measure at least one of a shaft voltage and a shaft current.

28 Claims, 1 Drawing Sheet

APPARATUS AND METHOD FOR DETECTING VIBRATIONS OF THE SHAFT ASSEMBLY IN AN ELECTRICAL MACHINE

This patent application is a continuation for International Patent Application No. PCT/EP2003/50610, filed on Sep. 5, 2003, which claims priority to Swiss Patent Application No. CH 2002 1529/02, filed on Sep. 10, 2002. The entire disclosure of both applications is incorporated by reference herein.

The present invention relates to a method and an apparatus for detecting vibrations of the shaft assembly in an electrical machine, in particular in power plants.

BACKGROUND

Vibrations of the shaft assembly of a machine, in particular of a turbo generator assembly, may be of a variety of types. They may be bending vibrations or transverse vibrations which occur in the direction perpendicular to the shaft. Furthermore, so-called oscillations may occur, i.e. generally changes in the rotational frequency of the shaft, which are damped quasi-periodically, about the system frequency of generally 50 Hz (or 60 Hz), which are generated by, for example, sudden disruptions to the system. A third type of vibrations of the shaft is the actual torsional vibrations which may be generated, for example, by sudden increases in the load on the system. Torsional vibrations are in this case vibrations which are manifested in a non-uniform rotational frequency along the shaft (phase shifts or frequency shifts), i.e. bring about torsion in the shaft.

Torsional vibrations are very small vibrations, generally in the region of 0.01 degrees phase amplitude, which can, however, lead to a very high load on the shaft, and, in particular, breakdown of the natural frequency of such a torsional vibration with the stimulus exciting this torsional vibration may lead to a hazardous escalation of such torsional vibrations, which may even result in breakage of the shaft. In this case, torsional vibrations may have frequencies of a few Hz to 200 Hz, the frequency naturally depending on the material composition and thickness of the shaft, the masses associated with the shaft, and the size of the system. In particular in the case of large systems having long shafts, these torsional vibrations may be extremely critical.

In accordance with the importance of this problem, a large number of patent specifications have already dealt with this topic. For example, U.S. Pat. No. 3,934,459 describes a measuring device and a method for measuring the torsional vibrations of the entire shaft assembly of a turbine generator system. For this purpose, the torsional vibrations are sensed at one or more points on the shaft by means of one or more sensors which are not specified in any more detail. The further-processing of the torsion signals is the main topic of this specification. The further-processing takes place by filtering using bandpass filters and multipliers in order to determine, in the end, the maximum torques.

In addition, mention will be made of U.S. Pat. Nos. 3,885,420, 4,148,222, 4,137,780 and 4,317,371, which all describe measuring devices or methods for measuring torsional vibrations of such electrical systems. For the purpose of detecting the torsional vibrations, toothed wheels connected to the shaft are used as the signal transmitters which produce electrical signals via sensors. The signals are further-processed by means of bandpass filters and multipliers etc. U.S. Pat. No. 4,317,371 describes a special demodulation method for measuring phase shifts. The method comprises the production of lower intermediate frequencies and the subsequent frequency demodulation, as is known per se from radio technology. Another method (U.S. Pat. No. 3,885,420) uses a phase-locked loop (PLL) for demodulation. In addition, reference is made to U.S. Pat. No. 4,444,064, which describes a method in which initially a magnetic pattern is impressed in the shaft, and is subsequently used as the pulse generator. Another concept for measuring torsional vibrations is based on the fact that the voltage at the phase winding clamps of the permanent magnet generator, which is coupled to the shaft, is used for the purpose of determining such vibrations. Evaluation of the generated voltages will give an indication of the torsional vibrations. The evaluation takes place, in turn, by means of frequency demodulation (PLL technique). One advantage of this arrangement is the lower costs in comparison to the toothed wheel solution.

SUMMARY OF THE INVENTION

An object of the present invention is to provide, on the one hand, an alternative method for detecting torsional vibrations, and, on the other hand, an apparatus for detecting further vibrations of the shaft assembly of a machine, which has sufficient accuracy and, in the process, can be implemented simply, in design terms, and in a cost effective and robust manner. In particular, the natural frequencies of the shaft assembly, which are difficult to measure during operation, are detected, in particular also their changes over the course of time.

The present invention provides a method for detecting vibrations of the shaft of an electrical machine, characterized in that, for the purpose of detecting the vibrations, the shaft voltage ($U_S(t)$) and/or the shaft current ($I_S(t)$) is measured and analyzed.

As has been described, for example, in the specification EP-A1-0 271 678 and the later specification DE-A1-197 42 622, for various reasons shaft voltages and shaft currents occur at the generator shaft of a generator, which is usually part of a turbo group, the frequency spectrum of said shaft voltages and shaft currents ranging from the direct current to higher frequencies which, as multiples, are associated with the rotational frequency of the generator, but also with the frequencies of a static excitation system of the generator. In this case, pronounced harmonics of the fundamental frequency can be observed in the spectrum of the primarily periodic function (period=rotational frequency of the rotor).

The shaft voltages or shaft currents come about, inter alia, owing to magnetic asymmetries in the vicinity of the generator shaft, owing to electrostatic charges of the generator shaft, owing to external electrical fields which inject shaft voltages capacitively into the generator shaft, or owing to magnetic remanences in the rotating shaft, for example owing to residual magnetization of the shaft.

The shaft voltages and shaft currents represent, in principle, a potential risk for different components of the generator and may lead to damage to the generator if either they are not reduced to a tolerable level or else the grounding concept of the shaft assembly is not suitable. For this purpose, in the past special precautions were taken for the generator shaft by, for example, isolating paths being incorporated on the non-drive side of the generator and, on the drive side, the generator shaft being connected to the ground potential via brushes. In order to reduce voltage peaks, the generator shaft is often coupled in terms of AC voltage on the non-drive side to the ground potential via a capacitor by means of a sliding contact.

The shaft voltages and shaft currents may, however, also be used for monitoring the functional safety and functional reliability of the shaft grounding. The document mentioned initially EP-A1-0 271 678 specifies for this purpose a monitoring and evaluation circuit which provides a current path on the non-drive side of the generator by a resistor being connected in parallel with the dissipation capacitor, and evaluates machine-typical frequency components in the currents flowing through this RC combination. The RC combination provides a reliable connection between the shaft and ground potential, which reduces both static charges and higher-frequency voltages to levels which are unhazardous for the shaft bearing.

Another proposal (DE-A1-197 42 622) concerns measuring the shaft current flowing through a grounding path of the generator shaft on the drive side, and determining a frequency of the shaft current, from which the cause of the shaft current is then derived.

The present invention is based, in part, on the unexpected discovery that the shaft current or the shaft voltage contains not only the aforementioned information in accordance with EP-A1-0 271 678 on the functional reliability and the functional safety of the shaft grounding, or else the information in accordance with EP-A2-0 391 181 which should also be mentioned on the rotor turn-to-turn faults, but also that these signals contain extensive information on all types of vibrations of the shaft. It is correspondingly possible to dispense with the apparatuses which generally need to be provided specially for measuring such vibrations, and to measure the shaft voltage or shaft current using the possibly already existing devices for monitoring the functional reliability or the rotor turn-to-turn faults and to draw conclusions, from the data obtained in the process, on vibrations of the shaft. The measurement of the shaft current and/or shaft voltage is in this case a sufficiently accurate and very suitable method, in particular for long-term observations, for determining such vibrations of the shaft.

In accordance with a first, preferred embodiment of the method according to the invention, the detected vibrations are torsional vibrations and/or transverse bending vibrations and/or oscillations of the shaft. In this case, not only the presence of a specific type of individual vibrations can be established but also the temporal sequence and intensity thereof.

In accordance with a further preferred embodiment, the measurement of the shaft voltage and/or the shaft current takes place such that a low-resistance connection to ground is provided at a first point on the shaft, upstream of the generator, and such that, at a second point on the shaft, downstream of the generator, the shaft voltage, i.e. the voltage between the shaft and ground, and/or the shaft current, i.e. the current flowing to ground, is tapped off via a unit, for example a high-resistance RC unit between the shaft and ground, and analyzed in an analysis unit. In this case, for analysis of the shaft voltage and/or the shaft current, the signal is particularly preferably measured and recorded as a function of time and analyzed as a function of time. The sampling can in this case take place at a sampling rate which corresponds to the system frequency or to integral multiples of the system frequency divided by the number of pole pairs in the generator. The resulting signal (voltage or current) is preferably investigated as regards frequency modulations and/or amplitude modulations of the harmonics of the shaft voltage/current spectrum, which it contains. In this case, possibly after demodulation or downmixing of the signal, sections are preferably subjected to a Fourier transformation at a carrier frequency, in particular at the system frequency or harmonics thereof, and the resulting spectrum is analyzed for instances of line broadening of the harmonics, in the case of frequency modulations, or for sidebands, or else bands in the baseband, in the case of amplitude modulations. This type of analysis allows for simple visualization of the corresponding signals which are characteristic of specific vibrations.

When using a Fourier transformation, it has proved to be suitable to digitize the signal at a sampling rate of 1–10 kHz, in particular to sample in the region of 5 kHz, and then, for the purpose of determining fine structures, as occur in the case of oscillations and/or torsions, to in each case subject sections of the signal of in the range from 50 k to 100 k data points, in particular in the region of 64 k data points, to a Fourier transformation (FFT). For the bending vibrations which are expressed as an amplitude modulation in the range from 1 to 180 Hz, or even up to 300 Hz, in each case sections of in the range from 0.5 k to 1.5 k data points, in particular in the region of 1 k data points, can be subjected to a Fourier transformation (FFT).

In principle, it has been shown that, given the presence of transient, transverse bending vibrations, transient lines at frequencies in the range from 1 to 300 Hz are observed in the spectrum, and that, given the presence of oscillations, instances of broadening of the line at the system frequency or at harmonic multiples thereof can be observed, the shifts lying in the range from 2–4 tenths of a percentage of the corresponding frequency and occurring on a time scale of up to 1 second. In contrast to this, given the presence of torsional vibrations, phase modulations with a speed in the range from approximately 50 to 200 Hz are generally observed.

Detection and analysis of the vibrations of the shaft is normally to be understood to mean that vibration characteristics are determined from the shaft voltage ($U_S(t)$) and/or the shaft current ($I_S(t)$). These vibration characteristics are preferably natural vibration frequencies, i.e. resonant frequencies. Possible vibration characteristics are, in particular, a) horizontal and/or vertical, bending-critical natural frequencies and/or b) natural torsion frequencies and/or c) natural oscillation frequencies. In addition, the amplitude and phase at the natural frequencies may optionally be determined and analyzed. All of these natural frequencies or modes can assume values which lie in the range of the rated speed, i.e. in the region of 50 or 60 Hz. Natural frequencies may also be provided, whose harmonic multiples come to lie in this range. For example, up to 20 torsional modes may occur at frequencies of less than or equal to 50 Hz, i.e. the natural frequency density may be considerable.

In order to prevent or to monitor hazardous escalation of such vibrations, in particular there should be no natural frequencies of disadvantageous vibrations in the vicinity of the rated speed. Correspondingly, it has proved to be advantageous to categorize natural vibration frequencies as critical if they or their harmonic multiples are in the region of +/−10% of the rated speed, preferably in the region of +/−5% of the rated speed of normally 50 or 60 Hz. The width of the window which should remain resonance-free in this case naturally results from the normally maximum deviations from the rated speed.

Further preferred embodiments of the method according to the invention are described in the dependent claims.

The present invention also relates to an apparatus for carrying out a method, as has been described above, which apparatus is characterized in that a low-resistance connection to ground of the shaft is provided at a first point on the shaft, and in that a high-resistance RC unit is provided between the shaft and ground at a second point on the shaft, via which RC unit the shaft voltage and/or the shaft current is tapped off and is analyzed in an analysis unit for components which are characteristic of vibrations of the shaft. In this case, the low-resistance connection to ground is particularly preferably implemented via the so-called driving end module (DE module), i.e. via a low-value resistor to the contact apparatus to the shaft, a fuse also being arranged in series. At the actual measuring point, it has proved advantageous to insert the RC unit, which has a fuse to the contact apparatus to the shaft, said RC unit being connected to ground via one or more capacitors (which may be connected), as well as, in parallel therewith, a resistor, a shunt resistor being arranged between ground and the capacitor or resistor. In this case, the shaft voltage is measured between the fuse and ground, and the shaft current is measured indirectly via the shunt resistor. Since it is very important for the quality of the data and thus for their interpretation to make safe and reliable contact with the shaft, it has proved to be advantageous to use in each case a metal stranded wire as the contact apparatus, irrespective of the design of the contact module (DE module, RC module).

In this case, the measured shaft voltage or the measured shaft current is preferably detected as a function of time and fed to an analysis apparatus, the analysis apparatus having means for digitizing the signal (voltage, current), means for subjecting this digitized signal to a Fourier transformation, and means for spectrally displaying the transformed data, in addition the presence, type and intensity of vibrations of the shaft particularly preferably being automatically determined numerically in accordance with specific criteria and displayed in simplified form. The criteria are in this case the abovementioned characteristic spectral properties of the individual vibrations.

Further preferred embodiments of the apparatus according to the invention are described in the dependent claims.

BRIEF DESCRIPTION OF THE DRAWING

The invention will be explained in more detail below with reference to exemplary embodiments in conjunction with the drawing, in which.

DETAILED DESCRIPTION

Figure 1:
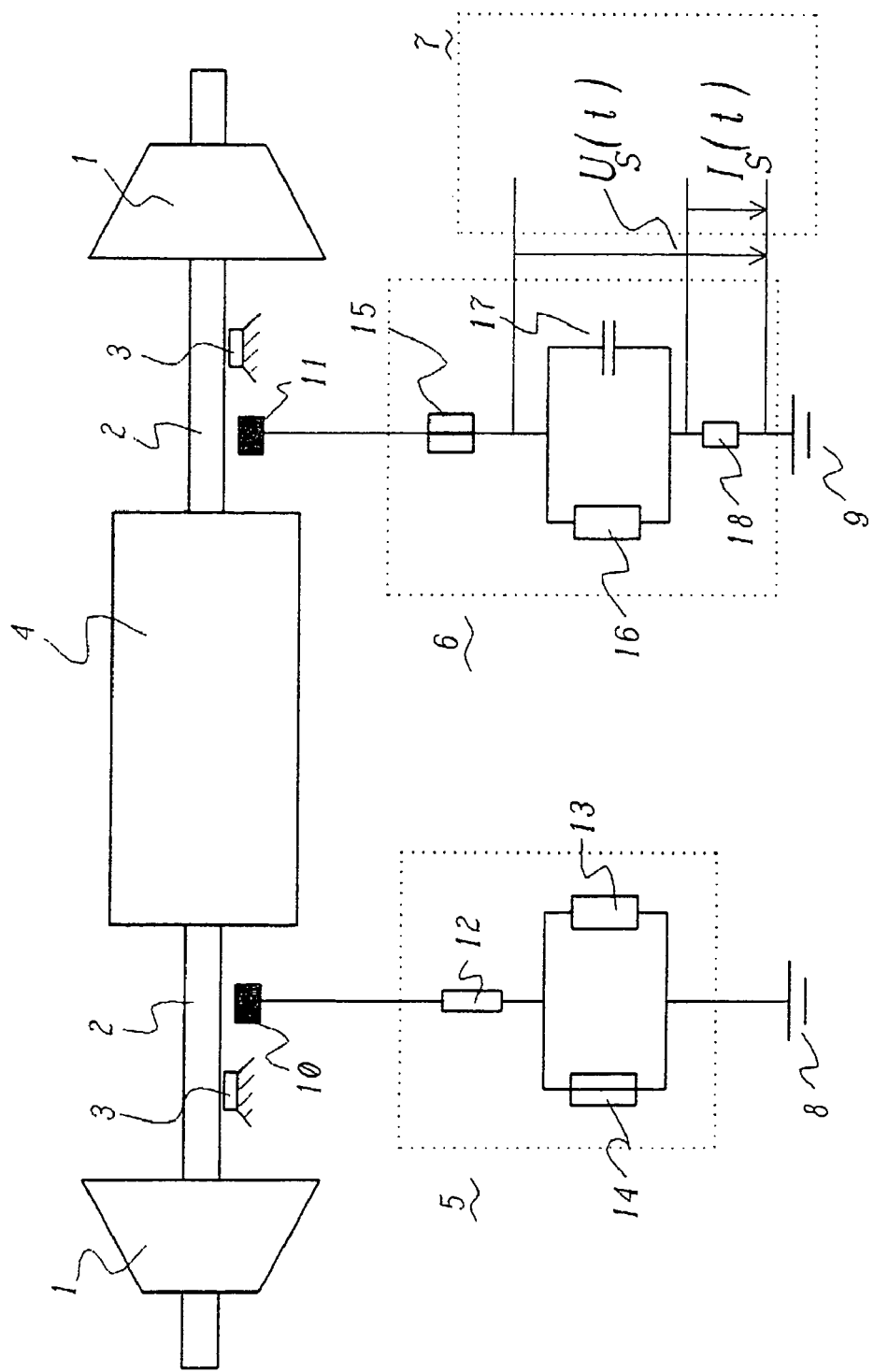
FIG. 1 shows a schematic illustration of an apparatus for measuring the shaft voltage $U_S(t)$ or the shaft current $I_S(t)$ as a function of time (t).

The FIG. 1 shows a schematic illustration of a gas turbine plant, in which two turbines 1 are arranged on either side of a generator 4, the two turbines 1 and the generator 4 being arranged on a common shaft 2 or a shaft assembly. The two turbines are in this case to be understood merely as an example; it is also possible for only one turbine to be arranged. In order to be able to disconnect the generator 4, for example when the turbines 1 are stepped up, couplings are generally provided which make it possible to mechanically decouple the turbines 1 from the generator 4.

The shaft 2 is mounted on at least two shaft bearings 3. The oil films present in the bearings 3 insulate the shaft 2 electrically from the bearings 3 which are connected to ground. This insulation may, however, fail at voltage peaks above a specific level, which may lead to problems with electric spark erosion.

As has already been mentioned initially, for various reasons shaft voltages and shaft currents occur on such a generator shaft of a generator 4, the frequency spectrum of said shaft voltages and shaft currents ranging from the DC value to frequencies which, as multiples, are associated with the rotational frequency of the generator, but also with the frequencies of a static excitation system of the generator.

The shaft voltages or shaft currents come about, inter alia, owing to magnetic asymmetries in the vicinity of the shaft 2, owing to electrostatic charges of the shaft 2, owing to external electrical fields which inject shaft voltages capacitively into the shaft 2, or owing to magnetic remanences in the rotating shaft 2, and owing to residual magnetization (owing to manufacture) of the shaft 2.

The shaft voltages, generally referred to below as $U_S$, and shaft currents, generally referred to below as $I_S$, represent, in principle, a risk for different components of the generator and may lead to damage to the generator. According to the invention, however, the shaft voltage or the shaft current is now used for targeted analysis and detection of vibrations of the shaft of an electrical machine.

For this purpose, a low-resistance connection to ground 5, for example a so-called DE module 5 (driving end module) is connected to the shaft 2 on one side of the generator 4, and this essentially ensures reliable grounding of the shaft 2 to ground 8. On the other side of the generator 4, a so-called RC module 6 (R stands for resistor, C stands for capacitor), which is connected to an analysis unit 7, is, on the one hand, connected to the shaft 2 and, on the other hand, connected to ground 9.

The DE module 5 is connected to the shaft 2 via a contact apparatus 10. The contact apparatus is preferably a Cu braid, which is in electrical contact with the shaft 2 such that it rubs against it. The DE module 5 forms a low-resistance connection to ground 8 by initially a low-value resistor 12 being connected between the contact apparatus 10 and ground 8. The resistor 12 typically has a value of R in the range from 1 to 10 ohm. A fuse 14, connected in parallel with a resistor 13, may be provided between the resistor 12 and ground 8. The DE module 5 thus initially ensures a low-resistance connection to ground of the shaft 2.

On the other side of the generator 4, the RC module 6 is generally arranged for the purpose of dissipating radiofrequency peaks. Said RC module 6 likewise has a contact apparatus 11 to the shaft 2 which in turn is preferably in the form of a Cu braid which is in electrical contact with the shaft 2. The RC module 6 initially has a fuse 15 to the shaft, generally a fuse of the type 2AT (the fuse is also used here to protect against high currents), and, connected in series therewith, a resistor 16, a capacitor 17 being connected in parallel with said resistor 16. Quite generally, the resistor 16 arranged in parallel with the capacitor 17 has a value R of in the range from 100 to 10 000 ohm, preferably from 400 to 1000 ohm. The capacitor 17 has a value C of typically in the range from 1 to 30 F.

Between the fuse and ground, the shaft voltage $U_S(t)$ is now tapped off as a function of time and is passed on via a coaxial cable to the analysis unit 7. In addition, a shunt resistor 18 is located between the grounding point 9 and the parallel arrangement comprising the resistor 16 and the capacitor 17, and the shaft current $I_S(t)$ can be calculated and logged at said shunt resistor 18 via the voltage drop occurring across said shunt resistor 18. This information is also passed on to the analysis unit 7 via a coaxial cable.

The measured shaft voltage as a function of time, $U_S(t)$, or the measured shaft current as a function of time, $I_S(t)$ now contains information on all movements of the shaft. In this case, the movements of the shaft are vibrations such as transverse bending vibrations of the shaft 2 (movement type A), oscillations of the shaft 2 (movement type B) or torsional vibrations of the shaft 2 (movement type C). In this context, oscillations are changes in the rotational speed of the rotor about the actual rated frequency. They come about, for example, if there are disruptions to the system, which is generally operated at 50 or 60 Hz, which are injected into the movement of the rotor and, for example, slow it down. This then even results in an oscillation of the rotor frequency about the rated frequency, which can become critical in particular when this oscillation is a natural frequency of the system, since in this case escalation is possible. Torsional vibrations occur, for example, when a sudden increase in the load on the system occurs and the generator is braked to a certain extent for a short period of time by this increase in load (which naturally also again causes oscillations).

The evaluation of the shaft current or shaft voltage makes it possible to diagnose all three movement types (A, B or C). In order to measure torsional vibrations (type C) and oscillations (type B), in this case methods for frequency demodulation can preferably be used which are insensitive to amplitude fluctuations. In order to measure bending vibrations (type A), methods for amplitude demodulation can be used. In both cases, a large number of harmonics of the shaft signal can be used in the process.

The evaluation with the aid of a Fourier transformation of the time signal $U_S(t)$ or $I_S(t)$ has proved to be particularly suitable for the analysis. In order to increase the measurement accuracy or to simplify the filtering of the input data, the corresponding time signal can be mixed with a carrier signal or with the corresponding carrier signal which has been shifted through v/2 in the form of a quadrature detection and stored in a separate real or imaginary part and subjected to a Fourier transformation (FFT). A suitable carrier signal is, for example, the system frequency, or an integral multiple thereof, which can, for this purpose, be tapped off possibly directly from the system or at a suitable other location or is generated locally.

The input signal $U_S(t)$ (typically in the region of less than 15 V) or $I_S(t)$ is initially digitized in an analog-to-digital converter (ADC) at a sampling rate of typically 5 kHz, and then sections of this digitized time signal $U_S(t)$ or $I_S(t)$ are subjected to a Fourier transformation. In order to analyze torsions, in this case the Fourier transformation of in each case one window of, for example, 64 k data points has proved to be expedient; when investigating bending vibrations, even a window of 1 k data points is generally sufficient, since the corresponding, spectral features are of a substantially coarser nature.

The signal may also be sampled at a sampling rate which corresponds to the system frequency or to an integral multiple of the system frequency divided by the number of pole pairs in the generator. This brings about a frequency shift by precisely this sampling frequency.

The bending vibrations (type A) are expressed in the corresponding spectrum on the one hand as sidebands of the shaft voltage/current harmonic, the sidebands being spaced apart from one another by the modulation frequency. This comes about owing to the fact that this type of vibrations causes amplitude modulations of the signal $U_S(t)$ or $I_S(t)$, it being possible for the modulation frequency to be approximately 1 to 300 Hz, and it being possible to see these modulations both on the fundamental harmonic of the shaft voltage/of the shaft current and on the corresponding harmonics. Bending vibrations are thus possible by simply considering or analyzing lines or their sidebands. This analysis may be visual or else automated. In addition, bending vibrations are also expressed as frequency lines in the baseband, i.e. "sidebands" about 0 Hz.

Oscillations (type B) generally take place about the fundamental frequency of the rotor. They are rapid changes in the rotational frequency, i.e. changes on a time scale of less than 1 second. This leads in the Fourier spectrum to line broadening on the line of the rotational frequency and on the harmonics. This line broadening is instances of broadening or a shift in the frequency of in the range from 3–4 tenths of a percentage of the frequency. Correspondingly, the occurrence of oscillations can be recognized visually or automatically using such instances of line broadening, and, in particular, their occurrence can be analyzed in temporal sequence.

Torsional vibrations (type C) lead to fine structures in the spectrum owing to the usually high frequencies. Torsional vibrations are generally in the range from 100 to 200 Hz and lead to very rapid frequency shifts or phase shifts on this time scale. They may also be recognized visually or automatically in the spectrum and analyzed.

The method described here can, however, be used not only for simply observing the movements of types A–C, but also for determining corresponding natural frequencies of the shaft assembly in these movement modes.

For this purpose, in particular the transient frequency components are evaluated, since only these allow conclusions to be drawn on the natural frequencies.

In this context, note should also be taken of the fact that the present method is particularly suitable for long-term observation of the behavior of shaft assemblies, since the complexity of the device is relatively low and the sensor, i.e. the shaft, is always provided. Thus, any need for revision that may exist can be deduced from the gradual, slow change in the natural frequencies of a shaft 2, and corresponding revisions can be planned and carried out in a targeted manner.

What is claimed is:

1. A method for detecting vibrations of a shaft of an electrical machine, the method comprising:
    measuring at least one of a shaft voltage and a shaft current so as to provide a signal; and
    analyzing the signal so as to determine a presence and a type of vibrations of the shaft, the type being at least one of torsional vibrations, bending vibrations, and oscillations.

2. The method as recited in claim 1, wherein the electrical machine includes a generator and the measuring includes providing a connection to ground at a first point on the shaft upstream of the generator and tapping off the at least one of the shaft voltage and the shaft current at a second point on the shaft downstream of the generator, and wherein the analyzing is performed in an analysis unit.

3. The method as recited in claim 2, wherein the tapping off is performed using a high-resistance RC module.

4. The method as recited in claim 1, wherein the measuring is performed as a function of time.

5. The method as recited in claim 4, wherein the electrical machine operates at a system frequency and includes a number of pole pairs, and wherein the measuring includes sampling at a sampling rate corresponding to the system frequency or to integral multiples of the system frequency divided by the number of pole pairs.

6. The method as recited in claim 5, wherein the analyzing includes investigating a signal corresponding to the measured shaft voltage or current and having a baseband, the investigating being performed with regard to at least one of a frequency modulation, an amplitude modulation, and frequency lines in the baseband.

7. The method as recited in claim 6, wherein in the analyzing includes evaluating transient processes in a spectrum.

8. The method as recited in claim 7, wherein the evaluating of the transient is performed so as to detect natural frequencies of the shaft assembly.

9. The method as recited in claim 6, wherein the analyzing includes subjecting a section of the signal to a Fourier transformation at a carrier frequency, dividing integral harmonics thereof by the number of pole pairs, and analyzing a resulting spectrum for at least one of instances of line broadening, sidebands, and frequency lines in the baseband.

10. The method as recited in claim 9, wherein the subjecting the section of the signal to the Fourier transformation is performed after a demodulation or down-mixing of the signal.

11. The method as recited in claim 9, wherein the carrier frequency is the system frequency.

12. The method as recited in claim 6, wherein the measuring includes sampling the signal at a sampling rate of 1–10 kHz, and wherein the analyzing includes subjecting sections of the signal in the range from 10 k to 100 k data points to a Fourier transformation so as to determine fine structures in the signals as occur in oscillations and/or torsional vibrations.

13. The method as recited in claim 12, wherein transient shifts or instances of broadening of the lines at the system frequency or at harmonic multiples thereof divided by the number of pole pairs are considered to be an indication of oscillations.

14. The method as recited in claim 12, wherein transient phase modulations are considered to be an indication of torsional vibrations.

15. The method as recited in claim 6, wherein the measuring includes sampling the signal at a sampling rate of 1–10 kHz, and wherein the analyzing includes subjecting sections of the signal in the range from 0.5 k to 1.5 k data points to a Fourier transformation so as to determine bending vibrations.

16. The method as recited in claim 15, wherein transient, non-harmonic lines at frequencies in the range from 1 to 300 Hz are considered to be an indication of bending vibrations in the spectrum.

17. The method as recited in claim 1, wherein the type of vibrations include natural vibration frequencies.

18. The method as recited in claim 17, wherein the natural frequencies include at least one of:
 a) horizontal and/or vertical, bending-critical natural frequencies;
 b) natural torsion frequencies; and
 c) natural oscillation frequencies.

19. The method as recited in claim 18, further comprising determining the amplitude and phase at the natural frequencies.

20. The method as recited in claim 17, further comprising categorizing the natural vibration frequencies as critical if the natural vibration frequencies or their harmonic multiples are in the region of +/−10% of the rated speed.

21. The method as recited in claim 1, wherein the analyzing of the signal includes determining at least one of a temporal sequence of the vibrations and an intensity of the vibrations in addition to determining the type of vibrations.

22. An apparatus for detecting vibrations of a shaft of an electrical machine, comprising:
 a first grounding device disposed at a first point on the shaft on a first side of the electrical machine;
 a second grounding device disposed at a second point of the shaft on a second side of the electrical machine, wherein the second grounding device is configured to measure at least one of a shaft voltage and a shaft current and provide a measurement signal; and
 an analysis unit in operative connection with the second grounding device configured to receive the measurement signal and to determine a presence and a type of vibrations of the shaft, the type being one of torsional vibrations, bending vibrations, and oscillations of the shaft.

23. The apparatus as recited in claim 22, further comprising at least one metal stranded wire disposed on at least one of the first and second grounding devices so as to make contact with the shaft.

24. The apparatus as recited in claim 22, wherein the first grounding device has a first contact apparatus for contacting the shaft, a low-value resistor connected to the contact apparatus, a high-value resistor connected to ground, and a fuse being disposed in parallel with the high-value resistor.

25. The apparatus as recited in claim 22, wherein the second grounding device has a second contact apparatus for contacting the shaft, a fuse connected to the contact apparatus, one or more parallel-connected capacitors, a resistor connected to ground in parallel with the one or more capacitors, and a shunt resistor disposed between ground and one of the one or more capacitor and the resistor, and wherein the shaft voltage is tapped off between the fuse and the ground connection, and the shaft current is tapped off via the shunt resistor.

26. The apparatus as recited in claim 25, wherein the signal corresponds to at least one of the measured shaft voltage and the measured shaft current determined as a function of time, the analysis unit including a first element for digitizing the signal and subjecting the digitized signal to a Fourier transformation so as to produce transformed data, and a second element configured to spectrally displaying the transformed data.

27. The apparatus as recited in claim 26, wherein the presence, type and intensity of vibrations of the shaft are determined automatically numerically in accordance with specific criteria and displayed in simplified form.

28. The apparatus as recited in claim 22, wherein the analysis unit is configured to determine at least one of a temporal sequence and an intensity of the vibrations in addition to determining the type of vibrations.

* * * * *